US012602512B2

(12) United States Patent
DeLuca et al.

(10) Patent No.: US 12,602,512 B2
(45) Date of Patent: Apr. 14, 2026

(54) DATA RESOLUTION USING USER DOMAIN NAMES

(71) Applicant: Unstoppable Domains, Inc., Las Vegas, NV (US)

(72) Inventors: Lisa Seacat DeLuca, Bozeman, MT (US); Braden Pezeshki, Reno, NV (US)

(73) Assignee: Unstoppable Domains, Inc., Las Vegas, NV (US)

( * ) Notice: Subject to any disclaimer, the term of this patent is extended or adjusted under 35 U.S.C. 154(b) by 446 days.

(21) Appl. No.: 17/848,773

(22) Filed: Jun. 24, 2022

(65) Prior Publication Data

US 2023/0418979 A1      Dec. 28, 2023

(51) Int. Cl.
*G06F 21/62* (2013.01)
*G06F 9/451* (2018.01)

(52) U.S. Cl.
CPC .......... *G06F 21/6254* (2013.01); *G06F 9/451* (2018.02)

(58) Field of Classification Search
CPC ..... G06F 9/00; G06F 9/02; G06F 9/04; G06F 9/06; G06F 9/22; G06F 21/6254; G06F 9/451
See application file for complete search history.

(56) References Cited

U.S. PATENT DOCUMENTS

| | | | |
|---|---|---|---|
| 9,553,981 B2 | 1/2017 | Czarnecki et al. | |
| 10,721,060 B1 * | 7/2020 | Kaizer | H04L 63/123 |
| 10,846,762 B1 | 11/2020 | Dennis et al. | |
| 11,558,344 B1 | 1/2023 | Pezeshki et al. | |
| 11,632,236 B1 * | 4/2023 | Kaizer | H04L 61/4511 |
| | | | 713/173 |
| 11,689,546 B2 * | 6/2023 | Rivlin | H04L 63/145 |
| | | | 726/22 |
| 11,750,570 B1 | 9/2023 | Eby et al. | |
| 2015/0356523 A1 | 12/2015 | Madden | |
| 2016/0217436 A1 | 7/2016 | Brama | |

(Continued)

FOREIGN PATENT DOCUMENTS

| | | |
|---|---|---|
| CN | 1984185 A | 6/2007 |
| WO | 2020/010023 A1 | 1/2020 |

OTHER PUBLICATIONS

"Why Are Some Domains Protected?", Unstoppable Domains, Mar. 11, 2022, https://support.unstoppabledomains.com/support/solutions/articles/48001186091-why-are-some-domains-protected, 3 pages.

(Continued)

*Primary Examiner* — Dhairya A Patel
(74) *Attorney, Agent, or Firm* — Edell, Shapiro & Finnan, LLC

(57) ABSTRACT

According to a present invention embodiment, a system for securing user data comprises one or more memories and at least one processor coupled to the one or more memories. The system receives a domain name provided by a user on a user interface in place of user data requested by the user interface to perform an operation. The system retrieves the user data requested by the user interface based on the domain name. The system provides the user data to perform the operation. Embodiments of the present invention further include a method and computer program product for securing user data in substantially the same manner described above.

12 Claims, 8 Drawing Sheets

(56) References Cited

U.S. PATENT DOCUMENTS

| | | | | |
|---|---|---|---|---|
| 2016/0330027 | A1 | 11/2016 | Ebrahimi | |
| 2019/0096021 | A1* | 3/2019 | Jarvis | G07F 17/0057 |
| 2019/0354964 | A1* | 11/2019 | Snow | G06F 16/907 |
| 2020/0406859 | A1 | 12/2020 | Hassani | |
| 2021/0058353 | A1 | 2/2021 | Creech et al. | |
| 2022/0198049 | A1 | 6/2022 | Dumas et al. | |
| 2022/0198444 | A1 | 6/2022 | Mee et al. | |
| 2022/0222245 | A1* | 7/2022 | Pezeshki | G06F 16/2379 |
| 2022/0237700 | A1* | 7/2022 | Sreenivasan | G06F 3/0488 |
| 2023/0162166 | A1* | 5/2023 | Keller | G06F 21/602 |
| | | | | 705/35 |
| 2023/0171225 | A1 | 6/2023 | Pezeshki et al. | |
| 2023/0360031 | A1* | 11/2023 | DeLuca | G06Q 20/3821 |
| 2023/0385791 | A1* | 11/2023 | Ayyagari | G06Q 30/0641 |
| 2023/0421399 | A1 | 12/2023 | Quirk et al. | |
| 2024/0048397 | A1* | 2/2024 | Badr | H04L 9/14 |
| 2024/0056525 | A1* | 2/2024 | DeLuca | H04M 3/38 |
| 2024/0146523 | A1* | 5/2024 | DeLuca | H04L 9/088 |
| 2025/0278792 | A1* | 9/2025 | Wales | G06Q 10/40 |

OTHER PUBLICATIONS

Wikipedia, "Blockchain", https://en.wikipedia.org/wiki/Blockchain, downloaded from the internet on Mar. 25, 2022, 27 pages.

"How does a transaction get into the blockchain?", Euromoney Learning, https://www.euromoney.com/learning/blockchain-explained/how-transactions-get-into-the-blockchain, downloaded from the internet on Mar. 25, 2022, 9 pages.

Benjamin Powers, "Brave Integrates Crypto Blockchain Domains, Expanding Access to Web 3.0—CoinDesk", https://www.coindesk.com/tech/2021/05/13/brave-integrates-crypto-blockchain-domains-expanding-access-to-web-30/, May 13, 2021, 10 pages.

"What is a non-fungible token (NFT)?", https://www.coinbase.com/learn/crypto-basics/plp-what-is-nft, downloaded from the internet on Mar. 25, 2022, 10 pages.

Michele D'Aliessi, "How Does the Blockchain Work? A Guide to Everything You Need to Know", OneZero, https://onezero.medium.com/how-does-the-blockchain-work-98c8cd01d2ae, Jun. 1, 2016, 21 pages.

James Beck, Blog, "Mirror.xyz Review: How to Use MetaMask to Compete in the $WRITE Race", Jul. 30, 2021, https://consensys.net/blog/metamask/mirror-xyz-review-how-to-use-metamask-to-compete-in-the-write-race, 14 pages.

Amaury Martiny, "One-click Login with Blockchain: A MetaMask Tutorial", https://www.toptal.com/ethereum/one-click-login-flows-a-metamask-tutorial, downloaded from the internet on Mar. 25, 2022, 16 pages.

Jeff Benson, "You Can Now Use Your .com Domain to Send and Receive Ethereum", https://decrypt.co/79517/you-can-now-use-your-com-domain-send-receive-ethereum Decrypt, Aug. 26, 2021, 8 pages.

"Claim your DNS name onchain in ENS", ENS, https://support.ens.domains/en/articles/7882690-claim-your-dns-name, downloaded from the internet on Feb. 9, 2024, 10 pages.

"Ethereum Name Service (ENS)", https://etherscan.io/token/0xc18360217d8f7ab5e7c516566761ea12ce7f9d72#readContract, downloaded from the internet on Feb. 9, 2024, 4 pages.

"Ethereum Name Service (ENS)", https://etherscan.io/token/0xc18360217d8f7ab5e7c516566761ea12ce7f9d72#writeContract, downloaded from the internet on Feb. 9, 2024, 2 pages.

"Unstoppable Domains (UD)", https://polygonscan.com/token/0xa9a6a3626993d487d2dbda3173cf58ca1a9d9e9f#readProxyContract, downloaded from the internet on Feb. 9, 2024, 3 pages.

"Unstoppable Domains (UD)", https://polygonscan.com/token/0xa9a6a3626993d487d2dbda3173cf58ca1a9d9e9f#writeProxyContract, downloaded from the internet on Feb. 9, 2024, 3 pages.

International Search Report and Written Opinion in International Application No. PCT/US23/71399, dated Nov. 16, 2023, 10 pages.

"DNS records for unstoppabledomains.com", Unstoppable Domains, https://www.nslookup.io/domains/unstoppabledomains.com/dns-records/, downloaded from the internet on Nov. 16, 2023, 5 pages.

"Unstoppable Domains launches Login with Unstoppable", https://unstoppabledomains.com/blog/introducing-login-with-unstoppable, Jan. 9, 2022, 7 pages.

"Introducing Blend: the Peer-to-Peer Perpetual Lending Protocol for NFT's", https://x.com/blur_io/status/1653051809240604674?s=20, downloaded from the internet Jun. 26, 2024, 2 pages.

Owen Fernau, "Blur Launches NFT Lending Protocol", The Defiant, https://thedefiant.io/news/nfts-and-web3/blur-nft-lending, May 2, 2023, 7 pages.

International Search Report and Written Opinion in International Application No. PCT/US23/68858, dated Oct. 19, 2023, 8 pages.

"Allowlists, denylists, and approved senders", Google Workspace Admin Help, https://support.google.com/a/answer/60752?hl=en#:~:text=Email allowlist-A list of, allowlist the contact's IP address 1, downloaded from the internet on Oct. 31, 2022, 1 page.

"S/MIME Digital Signatures", GlobalCerts, https://globalcerts.com/smime-digital-signatures, downloaded from the Internet on Oct. 31, 2022, 5 pages.

Blog, "Introducing Humanity Check—100% Opt-In", Unstoppable Domains, https://unstoppabledomains.com/blog/introducing-humanity-check, Mar. 13, 2022, downloaded from the internet on Mar. 25, 2022, 8 pages.

Antoni Zolciak, "Beyond KYC: Stricter Privacy Policies are Looming, But DeFi is Here to Stay", https://www.nasdaq.com/articles/beyond-kyc%3A-stricter-privacy-policies-are-looming-but-defi-is-here-to-stay, Dec. 8, 2021, 7 pages.

"Humanity Check Overview", https://docs.unstoppabledomains.com/login-with-unstoppable/humanity-check/humanity-check-for-login/, downloaded from the internet on Apr. 7, 2022, 5 pages.

"Progressive risk segmentation: your secret to balancing fraud prevention and conversion", https://withpersona.com, downloaded from the internet on Apr. 1, 2022, 7 pages.

Jennifer Lowe, "What is KYC and why does it matter?", Plaid.com, Aug. 12, 2021, 15 pages.

Alex Gomez, "Unstoppable Domains Email (What Is it and How Does it Work?)", Cyber Scrilla, https://cyberscrilla.com/unstoppable-domains-email/#:~:text=How, Sep. 1, 2022, 43 pages.

Adriel Estrada, "Introducing Unstoppable Email with Skiff", Unstoppable Domains, https://unstoppabledomains.com/blog/categories/announcements/article/unstoppable-email-skiff, Aug. 30, 2022, 7 pages.

"ERC: Claim Holder—Issue #735", https://github.com/ethereum/eips/issues/735, GitHub, ethereum/EIPs, downloaded from the internet on Oct. 14, 2022, 21 pages.

"LIPs/LSPs/LSP-6-KeyManager.md", GitHub, lukso-network/LIPS, https://github.com/lukso-network/LIPs/blob/main/SPs/LSP-6-KeyManager.md, downloaded from the internet on Oct. 14, 2022, 13 pages.

International Preliminary Report on Patentability in International Application No. PCT/US2023/068858, issued Dec. 18, 2024, 6 pages.

\* cited by examiner

300

START

RECEIVE REQUEST TO CREATE USER ACCOUNT    310

RECEIVE USER DATA AND PERMISSIONS    320

STORE USER DATA AND PERMISSIONS    330

340

YES    UPDATE TO USER DATA DATA?

NO

END

500

Add a new adddress

Country / Region

| United States ▼ |

510 Full name (First and Last name)

| anna.wallet |

520 Phone number

| anna.wallet |

530 Address

| anna.wallet |

| Apt, suite, unit, building, floor, etc. |

540 City        State        ZIP Code

| anna.wallet |    | Select ▼ |    | |

☐ Make this my default address

Delivery instructions (optional)
▶ Add preferences, notes, access codes and more

| Use this address |

Add a new adddress

Country / Region

United States ▼

510    Full name (First and Last name)

anna.wallet

Phone number

Address

Apt, suite, unit, building, floor, etc.

| City | State | ZIP Code |
| --- | --- | --- |
| | Select ▼ | |

☐ Make this my default address

Delivery instructions (optional)

▶ Add preferences, notes, access codes and more

Use this address

610 anna.wallet ⬜3

Domain owner address: 0x1443...3dec ⬜

620

Manage

○ Profile
○ Crypto
○ Website
○ Verify
○ Avatar [BETA]
○ Transfer
○ Self Domain

630

All fields are optional. Share what you want and nothing more.

Edit domain profile                                    View Profile ↗
Add information about yourself to your domain profile Profile image          ⬆ Upload Avatar
                                             Recommended size: 100x 100px.
                                             JPG or PNG. 5MB max size.

Display name

Description         Enter phone number

0/200

Phone number       Enter phone number

Location            Bozeman, MT

DATA RESOLUTION USING USER DOMAIN NAMES

BACKGROUND

1. Technical Field

Present invention embodiments relate to data access control, and more specifically, to controlling sharing of user data while obfuscating sensitive data.

2. Discussion of the Related Art

Standard approaches to managing a user's data online store the user's data at multiple locations across a network. When a user changes attributes, such as his or her address or telephone number, multiple online profiles that include the old address or telephone number must be manually updated. In addition, privacy rights of users may require that their personal identifiable information (PH) or other confidential data remain protected online. When a user provides their name, address, or telephone number, for example, the user typically must trust that the data is stored securely. However, as security breaches frequently occur, it is likely that a user's personal information will eventually be exposed, especially when the user has a large online presence.

SUMMARY

According to one embodiment of the present invention, a system for securing user data comprises one or more memories and at least one processor coupled to the one or more memories. The system receives a domain name provided by a user on a user interface in place of user data requested by the user interface to perform an operation. The system retrieves the user data requested by the user interface based on the domain name. The system provides the user data to perform the operation. Embodiments of the present invention further include a method and computer program product (e.g., including one or more computer readable media with executable instructions) for securing user data in substantially the same manner described above.

BRIEF DESCRIPTION OF THE DRAWINGS

Generally, like reference numerals in the various figures are utilized to designate like components.

FIGS. 5A-5C are schematic illustrations of an example graphical user interface for providing a domain name to a service according to an embodiment of the present invention.

FIG. 6 is a schematic illustration of an example graphical user interface for managing user data according to an embodiment of the present invention.

DETAILED DESCRIPTION

Figure 1:
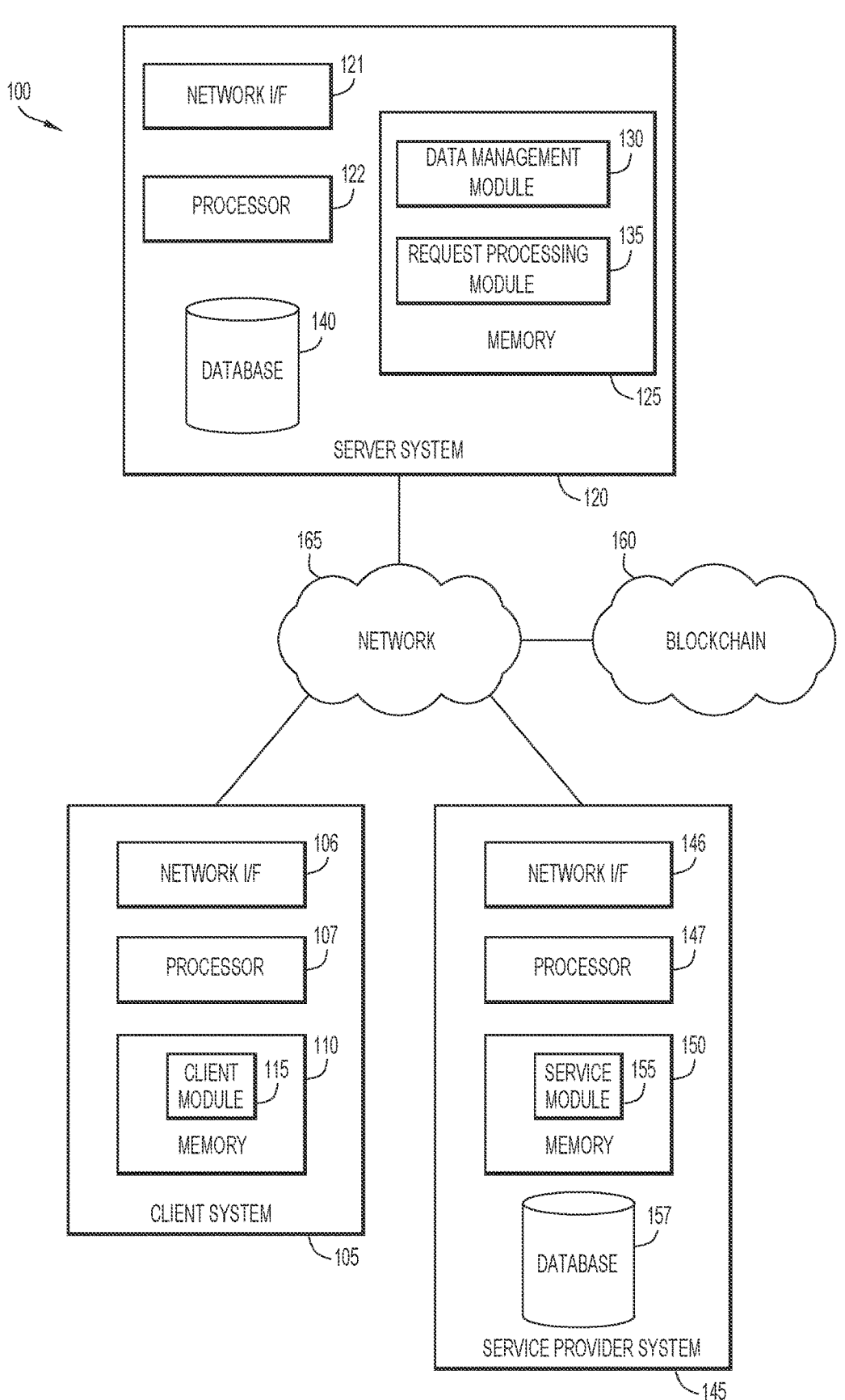
FIG. 1 is a diagrammatic illustration of an example computing environment according to an embodiment of the present invention.

An embodiment of the present invention employs a domain name that is provided in place of personal data to online services in order to obfuscate the personal data. The entity that is associated with the domain name can include, for example, a person, a family, an organization, a department, and the like. The domain name is securely linked to the personal data so that when a service requires the underlying personal data, the service may request the personal data using the domain name and, if authorized, the personal data is then provided to the service. In particular, the personal data can be stored on a blockchain, a decentralized storage platform, or in a database, with the domain name being represented by a non-fungible token (NFT) of a wallet associated with a public key or address. A user's personal data can accordingly be accessed using the user's domain name. For example, the blockchain may be searched for the domain name (or NFT) to retrieve the corresponding personal data from the blockchain. Alternatively, the blockchain entry for the domain name may indicate the personal data is stored in a database or decentralized storage platform (e.g., separate from the blockchain, etc.), and the corresponding personal data may be retrieved from the database or decentralized storage platform based on the domain name. Further, the database or decentralized storage platform may be accessed directly to retrieve the personal data based on the domain name.

Accordingly, present invention embodiments enable a user to provide a personal domain name in lieu of the user's personal data whenever a web or other service requests the user's personal data. Thus, the user retains control over his or her personal data by requiring the web or other service to request the underlying personal data using the domain name. Each request for personal data can be selectively granted or denied at any level of granularity, and enforcement can be performed according to a defined security policy and/or on an ad hoc basis by requiring manual user approval for each request.

Thus, present invention embodiments improve the technical fields of information science and cybersecurity by providing an improved approach to controlling access to user data, particularly when the data is provided for the purpose of being utilized by online services. Present invention embodiments utilize a unique approach to sharing personal data online in that a placeholder entity-specific domain name is used instead of the underlying information, thereby providing a safety mechanism that enables a user to maintain downstream control of his or her personal data. Moreover, usage of a domain name enables a user to update their data once and have that update automatically propagate to any service with which the user's data is shared. Present invention embodiments also improve the functioning of a computer by centralizing the process of securely accessing a user's data, thus removing the need for each individual third-party service to dedicate the processing resources, memory resources, and/or storage resources normally required to support encryption and decryption of user data. Additionally, storing user data to a blockchain ensures that user data is immutably stored, thereby providing both security and data resilience. User data can be confidentially stored in an encrypted form by encrypting the data and storing the encrypted data on a database, blockchain, or a decentralized storage platform.

Present invention embodiments will now be described in detail with reference to the Figures. FIG. 1 is a diagrammatic illustration of an example computing environment 100 in accordance with an embodiment of the present invention. As depicted, computing environment 100 includes a client system 105, a server system 120, a service provider system 145, a blockchain 160, and a network 165. It is to be understood that the functional division among components of computing environment 100 have been chosen for purposes of explaining present invention embodiments and is not to be construed as a limiting example.

Client system 105 includes a network interface (I/F) 106, at least one processor 107, and memory 110. Memory 110 includes a client module 115. Client system 105 may include a laptop computer, a tablet computer, a netbook computer, a personal computer (PC), a desktop computer, a personal digital assistant (PDA), a smart phone, a thin client, or any programmable electronic device capable of executing computer readable program instructions. Network interface 106 enables components of client system 105 to send and receive data over a network, such as network 165. In general, client system 105 enables a user to perform various operations in accordance with present embodiments, including, but not limited to, creating or modifying a user profile (e.g., adding, editing, and/or removing user data), managing data access permissions, authorizing usage of user data, and other operations. Client system 105 may include internal and external hardware components, as depicted and described in further detail with respect to FIG. 2.

Client module 115 may include one or more modules or units to perform various functions of present invention embodiments described below. Client module 115 may be implemented by any combination of any quantity of software and/or hardware modules or units, and may reside within memory 110 of client system 105 for execution by a processor, such as processor 107.

Client module 115 enables a user of client system 105 to manage user data that is associated with the user's domain name. In some embodiments, client module 115 is a web browser (or web browser extension) through which a user may access server system 120 in order to manage user data in conjunction with data management module 130 of server system 120. In various other embodiments, client module 115 may include any client (e.g., smartphone application, etc.) that can access server system 120 using, e.g., an application programming interface (API) or other interface. A user may initially authenticate with client module 115 by providing a username and password, a two-step verification code, and the like. In an embodiment in which client module 115 is a web browser, a user may enter the user's own domain name into a page that enables the user to authenticate and/or input or modify user data.

A user can input any user data, via client module 115, that the user wishes to be associated with the domain name of the user. In particular, a user can provide user data to specific data fields. The data fields can either be predefined or provided by a user, and can include, as a non-limiting example, a name field, an email address field, a mailing address field, a credit card field, a phone number field, a cryptocurrency wallet address field, and any other field. Thus, a user can provide his or her legal name to a name field, for example. Multiple fields of the same type may exist, as a user may wish to associate two or more email addresses, business addresses, etc., with the user's domain name. User data may also include media (e.g., image data, audio/video data, etc.), medical data (e.g., electronic health records), and any other data that a user would like to be securely associated with a domain name. When a user enters user data into a field, the user data may be provided to server system 120 so that the user's profile can be updated. Accordingly, client module 115 provides an interface for an end-user to manage the user data associated with their domain name.

Additionally or alternatively, client module 115 enables a user to authorize usage of the user data. When a requesting entity (e.g., service provider system 145) requests to resolve a user's domain name into the underlying user data, a user may receive a notification via client module 115, at which point the user may permit or deny the usage. Additionally or alternatively, a user can provide criteria to automatically approve or deny usage of the user data. For example, the user may permit any websites to obtain the user's email address, or a user may permit a predefined list of websites to obtain the user's phone number. A user can provide a list of websites for which the user must manually approve any requests for data, or the user can stipulate that a particular service may access certain user data based on an intended use of the data, data field, etc., while the service must be manually granted access to other user data. Thus, access to user data can be controlled at any level of granularity, either automatically or on an ad hoc basis.

Server system 120 includes a network interface (I/F) 121, at least one processor 122, memory 125, and a database 140. Memory 125 includes a data management module 130, and a request processing module 135. Server system 120 may include a laptop computer, a tablet computer, a netbook computer, a personal computer (PC), a desktop computer, a personal digital assistant (PDA), a smart phone, a thin client, a rack-mounted server, or any programmable electronic device capable of executing computer readable program instructions. Network interface 121 enables components of server system 120 to send and receive data over a network, such as network 165. Server system 120 may include internal and external hardware components, as depicted and described in further detail with respect to FIG. 2.

In general, server system 120 and its components enable users to access, manage, and store user data. Additionally or alternatively, server system 120 processes requests for user data from requesting entities (e.g., service provider system 145, etc.). The software components of server system 120, which include data management module 130 and request processing module 135, may themselves include one or more modules or units to perform various functions of present invention embodiments described below. Data management module 130 and request processing module 135 may be implemented by any combination of any quantity of software and/or hardware modules or units, and may reside within memory 125 of server system 120 for execution by a processor, such as processor 122.

Data management module 130 enables a user to provide user data, access user data, modify user data, define access permissions for user data, and perform other operations in accordance with present invention embodiments. Generally, data management module 130 processes instructions for managing user data by accessing the storage location of the user data. Data management module 130 may receive instructions from client system 105 to add, modify, or remove user data; the instructions may be generated based on a user's interactions with client module 115. Additionally, data management module 130 may be provided with access permissions for the user data, which can be stored locally to server system 120 and/or along with the user data (e.g., as metadata).

User data may be securely stored (e.g., using data encryption) in one or more locations, which can include one or more conventional databases (e.g., database 140), a decentralized storage platform, and/or a blockchain (e.g., blockchain 160). Data management module 130 may encrypt user data for storage using various techniques (e.g., encryption/compression techniques, cryptographic (or public/private)

keys, etc.). In embodiments in which user data is stored in an encrypted form (e.g., on a database, decentralized storage platform, or blockchain), data management module 130 may decrypt the user data for retrieval In some embodiments, the user's data is stored in a database (e.g., an off-chain database). The user's data may be encrypted by data management module 130 using various techniques (e.g., encryption/compression techniques, cryptographic (or public/private) keys, etc.), and then provided to the database. Data management module 130 may further respond to requests for data by accessing the encrypted user data and decrypting the user data.

In some embodiments, the user's data is stored to a decentralized storage platform. The user data may be accessed from nodes of the platform based on content (e.g., a hash of the content serving as a file address, etc.). The user data that is stored to a decentralized storage platform may be encrypted by data management module 130 using various techniques (e.g., encryption/compression techniques, cryptographic (or public/private) keys, etc.). Data management module 130 may further facilitate accessing of data by decrypting the encrypted data for retrieval.

In some embodiments, the user's data is stored to a blockchain. User data that is stored to a blockchain may be encrypted by data management module 130 using various techniques (e.g., encryption/compression techniques, cryptographic (or public/private) keys, etc.). The data may be written by smart contracts to the blockchain, and data management module 130 may decrypt the encrypted data for retrieval. The encryption may utilize the keys of the blockchain of the user, where the user private key is used for encryption and the user public key is used for decryption. Since only the user public key can decrypt the encrypted user data, access to the user data can be controlled. Alternatively, the encryption and decryption may use public/private keys that are separate from the keys used for the blockchain.

It should be appreciated that the user data can be stored using any combination of storage mechanisms (e.g., off-chain database, decentralized storage platform, blockchain, etc.). Some portions of user data may be stored using one storage mechanism, and other portions of user data may be stored using another storage mechanism. The user data can be stored in any format, and some or all of the user data may be encrypted using a private key of a blockchain that is secured (and decrypted using a corresponding public key that is managed), using a separate private/public key encryption scheme, using a symmetric encryption scheme, and/or by any other mechanism for selectively granting access to data.

Request processing module 135 processes requests for user data from a requesting entity, such as service provider system 145. Each request includes the user's domain name, and can include additional contextual information, such as a data field in which the domain name has been inserted, a use case for the requested data, the identity of the requesting entity, and other contextual information. Request processing module 135 may access user data, and decrypt any encrypted data. In some embodiments, request processing module 135 accesses a blockchain (e.g., blockchain 160) to retrieve the requested user data, whereas in other embodiments, some or all of the user data may be stored in one or more databases (e.g., database 140) and/or a decentralized storage platform.

Request processing module 135 can determine whether a requesting entity is authorized to access the requesting data based on user-defined permissions, which indicates whether access to the user data is authorized based on one or more of the identity of the requesting entity, the data field of the user data, and/or the use case for the data. Thus, request processing module 135 may permit or deny a data request on the basis of the requesting entity's identity, including permitting or denying on a specific domain basis, a specific subdomain basis, an Internet Protocol (IP) address basis, a top-level domain of the requesting entity (e.g., .gov vs. .com,), and the like.

Further, request processing module 135 can permit or deny a request based on the data field into which the user provided the domain name. For example, when a user registers an account with a website, the user can provide his or her domain name into a phone number field during the registration process; then, when the website requests the underlying phone number, the website transmits a request to server system 120 that includes the domain name and an indication that the domain name was inserted into the phone number field. Once this request is received, request processing module 135 can determine whether the website is authorized to receive the user's phone number, and if so, may retrieve and provide the user data corresponding to the phone number. Additionally, a request can include a use case, such as an indication that the requested data is to be used for billing, advertisement, and the like, and request processing module 135 can permit or deny the request accordingly, based on the preferences that the user has provided with respect to use cases.

Database 140 may include any non-volatile storage media known in the art. For example, database 140 can be implemented with a tape library, optical library, one or more independent hard disk drives, or multiple hard disk drives in a redundant array of independent disks (RAID). Similarly, data in database 140 may conform to any suitable storage architecture known in the art, such as a file, a relational database, an object-oriented database, and/or one or more tables. Database 140 may store data that includes user data (e.g., encrypted personal data of one or more users), associations between domain names and user data, user-defined access permissions for each item of user data, and the like.

Service provider system 145 includes a network interface (I/F) 146, at least one processor 147, memory 150, and a database 157. Memory 150 includes a service module 155. Service provider system 145 may include a laptop computer, a tablet computer, a netbook computer, a personal computer (PC), a desktop computer, a personal digital assistant (PDA), a smart phone, a thin client, a rack-mounted server, or any programmable electronic device capable of executing computer readable program instructions. Network interface 146 enables components of service provider system 145 to send and receive data over a network, such as network 165. Service provider system 145 may include internal and external hardware components, as depicted and described in further detail with respect to FIG. 2.

In general, service provider system 145 and its components provides a service, such as a website that offers digital content, goods, services, and the like. The software components of service provider system 145, which includes service module 155, may itself include one or more modules or units to perform various functions of present invention embodiments described below. Service module 155 may be implemented by any combination of any quantity of software and/or hardware modules or units, and may reside within memory 150 of service provider system 145 for execution by a processor, such as processor 147.

Service module 155 performs operations in support of whichever service is offered by service provider system 145. In various embodiments, service module 155 can perform database management operations, financial transactions, digital content delivery, cloud services, and the like. In some embodiments, service module 155 is a web server.

Database 157 may include any non-volatile storage media known in the art. For example, database 157 can be implemented with a tape library, optical library, one or more independent hard disk drives, or multiple hard disk drives in a redundant array of independent disks (RAID). Similarly, data in database 157 may conform to any suitable storage architecture known in the art, such as a file, a relational database, an object-oriented database, and/or one or more tables. Database 157 may store user profile data, including any user domain names and corresponding data fields into which the domain names have been inserted. Additionally, database 157 can store any data relevant to the service being provided by service provider system 145 (e.g., inventory data, sales data, etc.).

Blockchain 160 is a distributed data ledger that is supported by a peer-to-peer network of computing devices. As such, blockchain 160 is a growing list of blocks that are cryptographically linked by providing a hash of the previous block, a time stamp, and transaction data. Blockchain 160 may be a public blockchain, a private blockchain, or a hybrid blockchain, and may support a variety of operations, including cryptocurrency exchange, smart contract execution, financial services, decentralized applications, and the like. Blockchain 160 can store any user data in accordance with present invention embodiments; in particular, user data may be associated with the user's domain name, and the underlying user data can be stored to blockchain 160 in an encrypted state. The particular computing devices that compose the peer-to-peer network of blockchain 160 may include computing devices of environment 100 (e.g., client system 105, server system 120, and service provider system 145) and/or may include other computing devices.

Network 165 may include a local area network (LAN), a wide area network (WAN) such as the Internet, or a combination of the two, and includes wired, wireless, or fiber optic connections. In general, network 165 can be any combination of connections and protocols known in the art that will support communications between client system 105, server system 120, service provider system 145, and/or components of blockchain 160 via their respective network interfaces in accordance with embodiments of the present invention.

Figure 2:
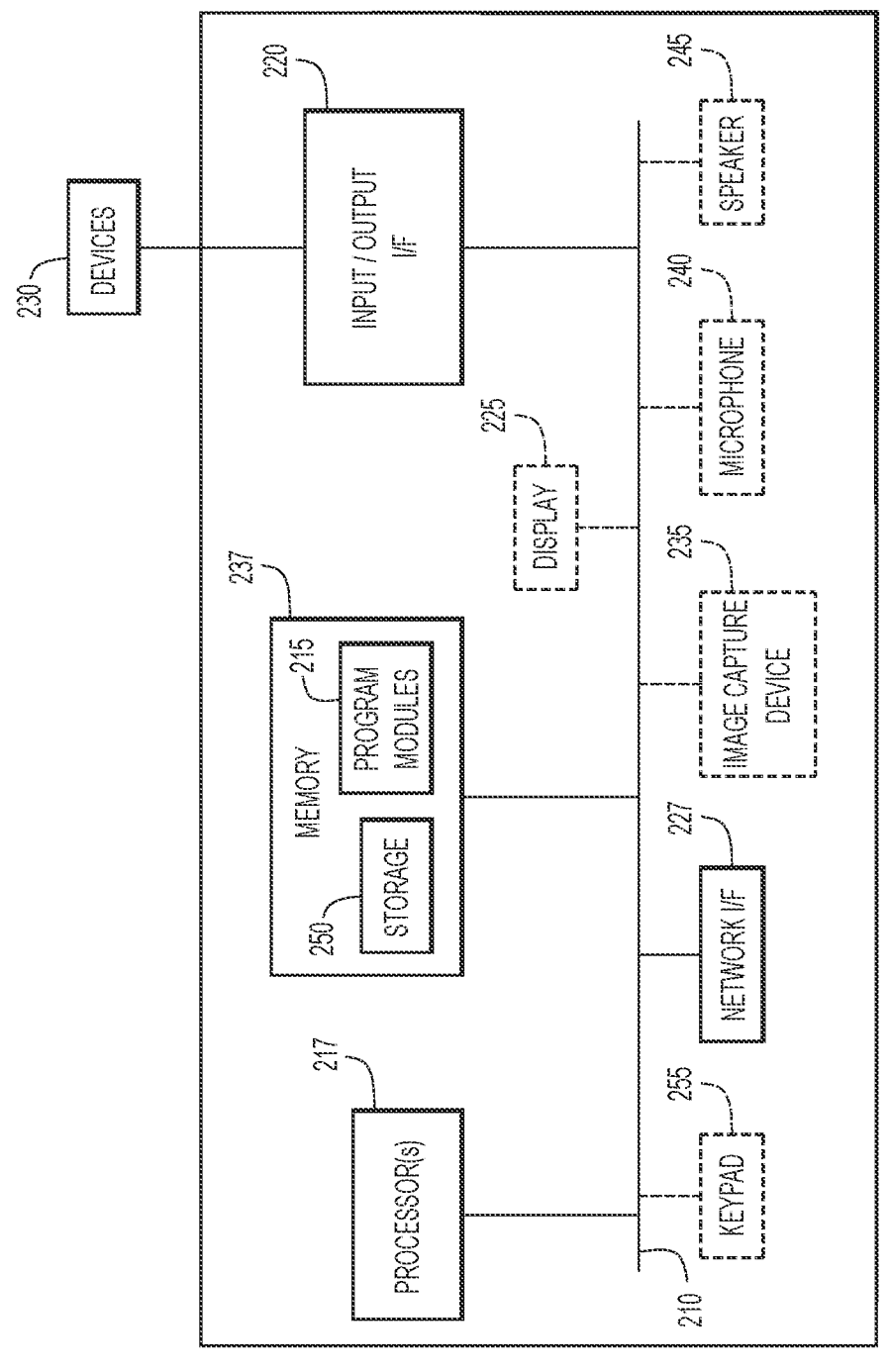
FIG. 2 is a block diagram of an example computing device according to an embodiment of the present invention.

An example of a computing device 200 of environment 100 (e.g., implementing client system 105, server system 120, service provider system 145, and/or any computing components that support blockchain 160) is illustrated in FIG. 2. The example computing device may perform the functions described herein. Computing device 200 may be implemented by any personal or other type of computer or processing system (e.g., desktop, laptop, hand-held device, smartphone or other mobile device, etc.), and may be used for any computing environments (e.g., cloud computing, client-server, network computing, mainframe, stand-alone systems, etc.).

Computing device 200 may include one or more processors 217 (e.g., microprocessor, controller, central processing unit (CPU), etc.), network interface 227, memory 237, a bus 210, and an Input/Output interface 220. Bus 210 couples these components for communication, and may be of any type of bus structure, including a memory bus or memory controller, a peripheral bus, and a processor or local bus using any of a variety of conventional or other bus architectures. Memory 237 is coupled to bus 210 and typically includes computer readable media including volatile media (e.g., random access memory (RAM), cache memory, etc.), non-volatile media, removable media, and/or non-removable media. For example, memory 237 may include storage 250 containing nonremovable, non-volatile magnetic or other media (e.g., a hard drive, etc.). The computing device may further include a magnetic disk drive and/or an optical disk drive (not shown) (e.g., CD-ROM, DVD-ROM or other optical media, etc.) connected to bus 210 via one or more data interfaces.

Moreover, memory 237 includes a set of program modules 215 (e.g., corresponding to client module 115, data management module 130, request processing module 135, service module 155, etc.) that are configured to perform functions of present invention embodiments described herein. The memory may further include an operating system, at least one application and/or other modules, and corresponding data. These may provide an implementation of a networking environment.

Input/Output interface 220 is coupled to bus 210 and communicates with one or more peripheral or external devices 230 (e.g., a keyboard, mouse or other pointing device, a display, biometric sensing devices, etc.), at least one device that enables a user to interact with computing device 200, and/or any device (e.g., network card, modem, etc.) that enables computing device 200 to communicate with one or more other computing devices. Computing device 200 may communicate with one or more networks (e.g., a local area network (LAN), a wide area network (WAN), a public network (e.g., the Internet), etc.) via network interface 227 coupled to bus 210.

With respect to certain entities (e.g., client system 105, etc.), computing device 200 may further include, or be coupled to, a touch screen or other display 225, a camera or image capture device 235, a microphone or other sound sensing device 240, a speaker 245 to convey sound, and/or a keypad or keyboard 255 to enter information (e.g., alphanumeric information, etc.). These items may be coupled to bus 210 or Input/Output interface 220 to transfer data with other elements of computing device 200.

By way of example, present invention embodiments pertain to the use of domain names to secure user data, particularly blockchain domain names or non-fungible token (NFT) domain names. Initially, a blockchain is generally in the form of a ledger that includes a series of records or blocks chained or linked together. Each block includes a hash of the prior block in the blockchain, a timestamp, and transaction information. The hash of the prior block enables the blockchain to be resistant to modification since changes to data in any prior block alters the hash value which propagates to subsequent blocks.

A blockchain is typically managed by a peer-to-peer network and used as a distributed ledger. Nodes of the peer-to-peer network communicate and verify new blocks according to a protocol. The peer-to-peer network provides a decentralized approach, where each node has a copy of the blockchain. Transactions are transmitted to the network, where mining nodes process the transactions. The mining nodes validate a transaction, insert the transaction into a current block, and transmit the block to the other nodes. Various consensus approaches may be used for combining validation results of different mining nodes to determine validity of a transaction (or block). In addition, a blockchain may store software (e.g., typically referred to as smart contracts) that executes in response to occurrence of predefined conditions. A blockchain may be public (e.g., no access restrictions, etc.), private (e.g., restricted access, etc.), or hybrid (e.g., with centralized and de-centralized features).

Users of transactions for the blockchain are authenticated based on cryptographic keys. These keys identify a user and provide access to a user account or wallet. The user wallet is basically an application or software that enables users to store and access digital assets (e.g., for receiving or sending cryptocurrency or other fungible tokens, non-fungible tokens (NFT), etc.). For example, a non-fungible token (NFT) is a crypto type asset with each token being unique (and representing items, such as digital art, music, or video game items), whereas fungible tokens (e.g., coins of the same cryptocurrency) have the same value of worth and are exchangeable. Each user is associated with their own private key (e.g., accessible only to the associated user, etc.) and a public key (e.g., typically an address on the blockchain). The private and public keys enable authentication of the user based on digital signatures in order to commence a transaction. The user account or wallet typically stores the private key.

For example, in order for the user to send cryptocurrency, a message for a transaction is encrypted with the private key of the user wallet. The private key enables only the user to control the user wallet. A digital signature is created by encrypting the message with the private key, where the digital signature is used to verify the user and transaction. The message may be decrypted with the corresponding public key of the user wallet. Since the private key is unique to the user, successful decryption of the message with the corresponding public key verifies the message was sent by the user. Once verified, the transaction may be posted to the blockchain, thereby adjusting the user wallet based on the transaction.

A blockchain domain name is stored on a blockchain. The blockchain domain name may be a non-fungible token (NFT) domain name that is associated with a non-fungible token (NFT) stored in a user wallet. The blockchain domain name may be associated with various information (e.g., wallet addresses, user information (e.g., name, address, email, etc.), data or other access restrictions, etc.). The blockchain domain name is associated with software or smart contracts on the blockchain that may perform various functions (e.g., provide a registry for corresponding wallet addresses, indicate locations of content for the domain (e.g., or a website, etc.) hosted on the blockchain or other system, etc.). In order to access a blockchain domain, the blockchain is accessed to find the record corresponding to the blockchain domain name (which may initiate the corresponding smart contracts, user data, etc., for the corresponding functionality). The private key of the user wallet enables the user to have sole control of the blockchain domain name (e.g., authenticating operations or transactions for the blockchain domain name similar to the cryptocurrency example described above, etc.). For example, the user may have sole control to perform operations that save user data to the blockchain, or alter saved user data and/or functionality for the blockchain domain name.

The domain name may include any quantity of terms, words, tokens, or arrangements of any quantity of any types of elements (e.g., alphanumeric or other characters, symbols, numbers, etc.). The domain name preferably includes a name portion and an optional extension that is associated with or indicates a hosting blockchain. By way of example, the domain name may be of the form "name.crypto" where "name" is the name portion and ".crypto" is the extension. The name portion and extension of the domain name may each include any quantity of terms, words, tokens, or arrangements of any quantity of any types of elements (e.g., alphanumeric or other characters, symbols, numbers, etc.).

Figure 3:
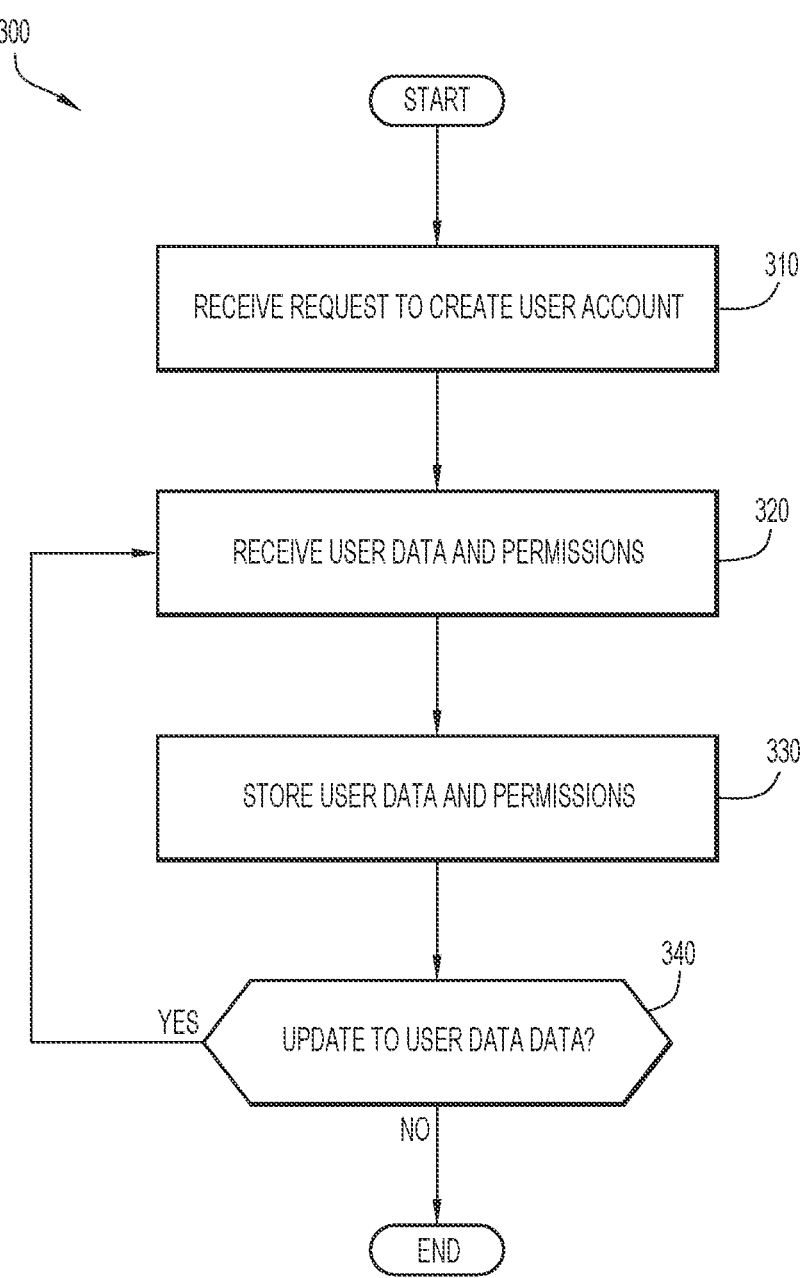
FIG. 3 is a flowchart of a method of managing user data according to an embodiment of the present invention.

FIG. 3 is a flowchart of a method 300 of managing user data according to an embodiment of the present invention.

A request to create a user account for registering a domain name is received at operation 310. A user may access a system that controls the initial registration and subsequent management of user accounts (e.g., server system 120) via a client application (e.g., client module 115) of an endpoint device (e.g., client system 105) to request creation of an account. The user can request a particular domain name to be associated with the account when the user registers his or her user account. In some embodiments, the domain name is a blockchain domain name that is stored on a blockchain, or an NFT domain name that is associated with an NFT that is stored in a wallet of the user. The user's request to create an account may be granted based on satisfaction of predefined criteria, such as the user submitting payment, the user completing a registration process, etc.

User data and any data usage permissions are received at operation 320. The user data and data usage permissions may be received by a component of a server (e.g., data management module 130 of server system 120). The user, via a user interface of client system 105, can provide any desired user data to populate a user profile that is associated with the user's domain name. For example, the user can provide a name, email address, mailing address, credit card number, billing address, phone number, cryptocurrency wallet address, government identifier (e.g., driver's license, passport, etc.), national identifier (e.g., social security number, etc.) bibliographic data (e.g., birthdate, citizenship), electronic health records (e.g., blood type, known allergies, International Classification of Diseases (ICD) codes, etc.), and the like.

Additionally, the user can provide data usage permissions by defining criteria that must be satisfied in order to grant access to each item of user data. The user can provide a list of requesting entities that are approved or denied, a list of use cases for which the user data is approved or denied, a list of data items that are always approved or denied, a list of data items that require manual approval, and the like. For example, the user may indicate that the user's email address is always approved to be shared with a requesting entity, whereas the user's credit card number always requires manual user approval at each transaction.

The user data and permissions are stored at operation 330. User data and permissions may be stored in a same location or in different locations. User data and permissions may be stored or otherwise managed by data management module 130 of server system 120. In some embodiments, permissions are managed by a server (e.g., server system 120), and the user data is stored using any storage mechanism or combination of storage mechanisms (e.g., off-chain database, decentralized storage platform, blockchain, etc.).

For example, the user data may be stored on the blockchain containing the transaction to create the domain name (or NFT). In some embodiments, the user data may be stored using a smart contract, which involves general-purpose computation that takes place on a blockchain. A smart contract can be deployed to a blockchain by sending a transaction that includes compiled code as well as a particular receiver address. The compiled code may execute when one or more conditions are met; in particular, the condition may include a request for user data, and the compiled code may include instructions to provide the user data to the receiver address when executed. The condition for execution can be satisfied by providing the smart contract with the domain name of the user, and optionally, a particular field (e.g., name, address) indicating a particular item of user data that is requested. The receiver address may include a wallet that is associated with the requesting entity (e.g., service provider system 145) or with a central server (e.g., server system 120), which can provide the request for user data to the blockchain and, when the user data is received, provide the user data to the requesting entity. In embodiments in which the field of the user data is specified in the request, the corresponding user data may be retrieved. Thus, for example, a smart contract can store and provide a single item of user data, or multiple items. In this case, the user data may be retrieved from the blockchain based on the domain name.

Alternatively, the user data may be stored off-chain in a database or decentralized storage platform and associated or linked to the domain name. The user data can be stored in a database using a conventional or other database management system. The user data can be stored in a relational database on which queries can be executed to access specific items of user data. For example, each item of user data can be stored in a particular cell that is defined by a row value and column value. The user data may be stored and accessed by associating the user's domain name with the data; for example, a particular table, cell, or range of cells may be indicated in the database by the user's domain name. A central server (e.g., server system 120) may pass requests for user data to the database management system in order to retrieve the user data on behalf of the requesting entity (e.g., service provider system 145).

Additionally or alternatively, user data can be stored in a decentralized storage platform. User data may initially be provided to a server associated with the decentralized storage platform provider, whereupon the data is encrypted, divided into multiple pieces, and stored across multiple decentralized nodes. When the user data is requested, the server associated with the decentralized storage platform provider can retrieve the encrypted pieces from the decentralized nodes, combine the pieces, and then decrypt the combined data to produce the requested user data. A decentralized storage platform may provide a desired level of redundancy to avoid outages. In particular, the number of pieces needed to reconstitute the user data may be fewer than the number of pieces that are stored across the decentralized nodes. For example, the encrypted user data may be split into 80 pieces and accordingly stored across 80 nodes; however, only 29 of those pieces may need to be retrieved in order to decrypt the user data. A central server (e.g., server system 120) may pass requests for user data to the decentralized storage platform in order to retrieve the user data on behalf of the requesting entity (e.g., service provider system 145). The decentralized storage platform may associate user data of a particular user with the user's domain name, so that the user's domain name is used to request pieces of data from decentralized nodes.

The blockchain for the domain name (or NFT) may contain an indication of the storage structure (e.g., database, decentralized storage platform, etc.) containing the user data, thereby enabling retrieval from the database or decentralized storage platform based on the domain name. In addition, the user data may be retrieved directly from the storage structure (e.g., database, decentralized storage platform, etc.) based on the domain name.

The user data in the blockchain, database, or decentralized storage platform may include, or be associated with, contextual information indicating the context for elements of the user data (e.g., name, address, credit card number, etc.). In addition, the user data may be stored in the blockchain, database, or decentralized storage platform in an encrypted form using various techniques (e.g., any conventional or other encryption/compression techniques, cryptographic (or public/private) keys, etc.). For example, the user data may be encrypted using a user private key of the blockchain and decrypted using the corresponding user public key, thereby limiting control of the decryption. Alternatively, the encryption may utilize public/private keys separate from the blockchain, or any conventional or other encryption/compression and decryption/decompression techniques.

Operation 340 determines whether there is an update to user data. If a user has accessed their user profile to add, modify, or remove data for one or more data fields, and/or to add, modify, or remove permissions, the updates may be received so that a server (e.g., server system 120) can process the changes and update the stored user data accordingly. The user may be required to authenticate any changes (e.g., by logging in, providing a private key to access the data, etc.).

Figure 4:
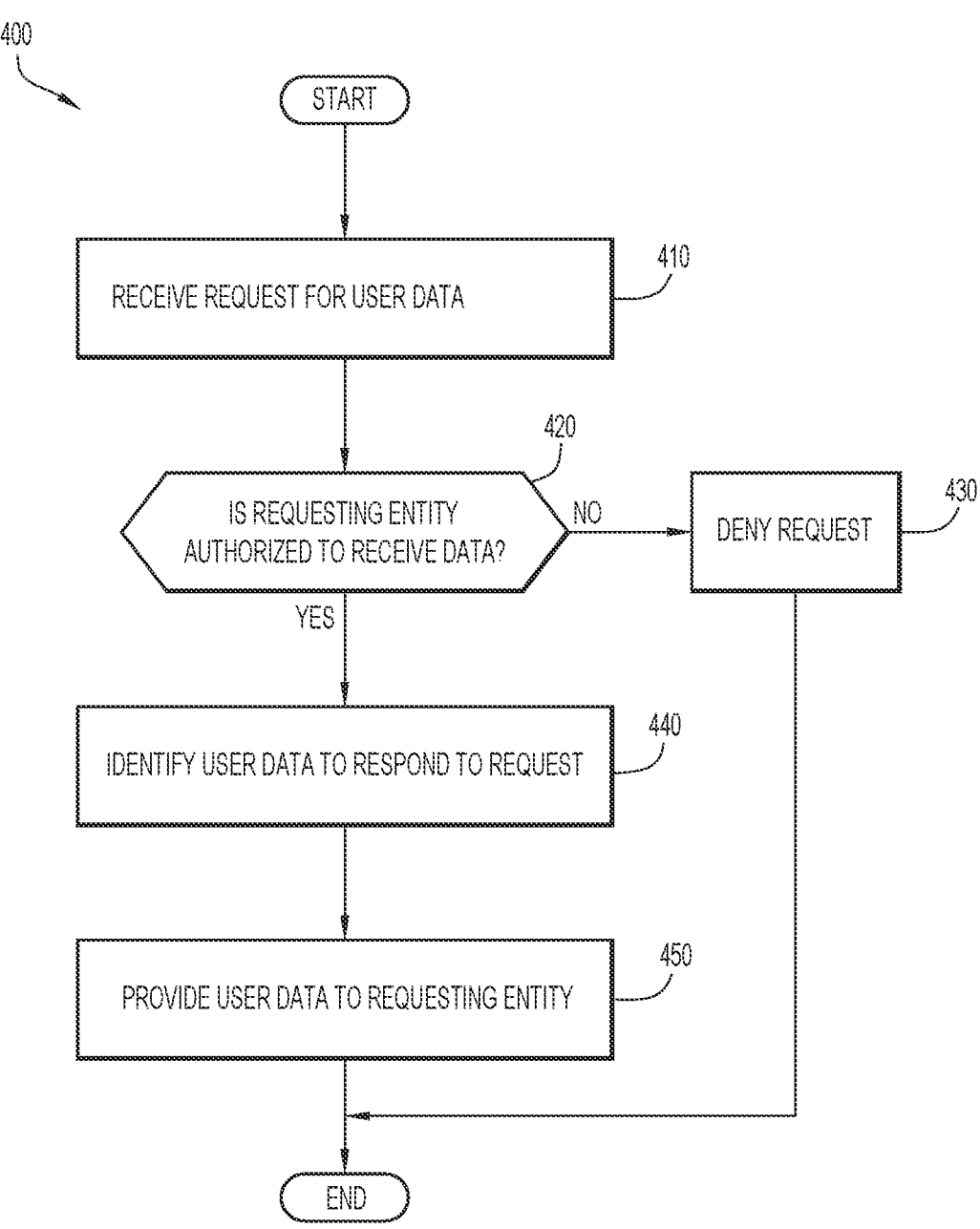
FIG. 4 is a flowchart of a method of securely providing user data to a requesting entity according to an embodiment of the present invention.

FIG. 4 is a flowchart of a method 400 of securely providing user data to a requesting entity according to an embodiment of the present invention. Initially, a user accesses a network site of a requesting entity that requests user data on a user interface. The user interface includes a series of fields each corresponding to an element of the requested user data (e.g., name, address, telephone number, etc.). The user may enter a domain name in one or more of the fields of the user interface to enable corresponding information for that field to be retrieved based on the domain name.

A request for the user data is received at operation 410. The request may be received by a component of a server (e.g., request processing module 135 of server system 120). The requesting entity (e.g., service provider system 145) may initially request user data using the domain name that the user provided the requesting entity. Along with the domain name, the request may indicate a data field into which the domain name was inserted, so that the proper data item can be selected out of a user's data set. In some embodiments, the requesting entity places the request in response to the user providing the requesting entity with the domain name. In other embodiments, the requesting entity places the request at a predefined or other time, such as when a transaction involving the domain name is finalized. For example, when a user purchases an item, and has inserted their domain name into a credit card number field, the requesting entity may place a request for the underlying credit card number when the user proceeds to a check-out stage of the requesting entity's electronic commerce page. In some embodiments, the request is handled by another party; for example, a service provider may store a user's domain name in a credit card field of the user's profile, and when the account is billed, the service provider may interact with the credit card issuer, which will place the request on behalf of the service provider. In some embodiments, the request for the underlying data may be placed at a specified time after an event, such as a check-out event. In particular, the request for the underlying data may be placed at a time of shipping (e.g., when a shipping label is printed), at a predetermined amount of time after an event (e.g., twenty-four hours later), and the like. The request for the underlying data may be placed in response to the occurrence of another action, such as a user input, execution of a smart contract on a blockchain, or other condition being satisfied.

In some embodiments, the user may input their domain name into multiple fields of a page, whereas in other embodiments, the user may input their domain name into a single field and the system may pull the corresponding values necessary to fulfill the order. In some embodiments, a special field can be provided that indicates to the user that submitting the user's domain name into that field causes the check-out operation to automatically complete (e.g., to accomplish a "one-click" checkout).

Operation 420 determines whether the requesting entity is authorized to receive the data. The request may be evaluated by a server (e.g., server system 120) against the user's permissions to determine whether the requesting entity is permitted access to the requested data item. In order to determine that the requesting entity is authorized to receive the data, request processing module 135 may process the data field of the requested data (e.g., user's name, telephone number, etc.) by evaluating the data field against the user's data access permissions. Additionally or alternatively, request processing module 135 may be provided, by the requesting entity, with a use case for the request, which may similarly be evaluated against the user's data access permissions in order to authorize the request. The use case for the request may be selected from a predefined list of use cases that is provided to a requesting entity (e.g., service provider system 145). For example, if the use case involves targeted advertising, a user may define permissions such that the request is denied. The requesting entity's identity may also be evaluated against the user's access permissions. Accordingly, a request for data can be granted or denied based on the identity of the requesting entity, use case of the request, type of data requested, and the like.

Additionally or alternatively, a user may define a security policy such that one or more data items require manual user approval in order to grant access to the data items. The security policy may be defined by a user using a user interface that enables the user to select access parameters (e.g., conditions, including requiring manual user approval, etc.) for access to the user data. A user can manually approve access to data items by signing of a message on-chain for approval using the user's cryptocurrency wallet, or a user can manually approve access to data items via another secured mechanism (e.g., two-factor authorization, etc.). The access parameters can be applied to each field of user data or to combinations of fields, including all of the user data. The security policy may be stored as a set of conditions for permitting or denying access to each item of data. Accordingly, the security policy can selectively enforce data access at any level of granularity to any item of user data.

When the requesting entity places the request, the user may receive a notification at the user's endpoint device (e.g., client system 105), such as a push notification, email, text message, and the like, to which the user may respond in order to grant or deny the request for data items requiring manual user approval.

If the requesting entity's request for data does not satisfy the access criteria, the request is denied at operation 430. In some embodiments, an error message may be provided to the requesting entity to indicate that access is denied.

Otherwise, if the request is authorized, the requested user data is identified to respond to the request at operation 440. Identifying the requested user data may include querying a data storage location to obtain the data. The location in which user data can be stored may include any storage mechanism or combination of storage mechanisms (e.g., off-chain database, decentralized storage platform, blockchain, etc.).

For example, user data that is stored on a blockchain can be retrieved by searching the blockchain for the domain name and retrieving the user data from the storage associated with the domain name. A central server (e.g., server system 120) may store an association between a user's domain name and one or more unique block identifiers so that user data stored to the blockchain can be accessed and retrieved. Correlations between specific user data items (e.g., name, address, etc.) and blocks can be stored by the central server, and whenever user data is requested, the central server can look up the unique identifiers for the block or blocks in which the user data is stored, and subsequently access the blockchain to retrieve data from those specified blocks. In embodiments that employ a smart contract to manage user data, the central server may provide the user's domain name to the smart contract that is executing on-chain, which will satisfy a condition of the smart contract, causing the smart contract to execute the instructions that provide the requested user data to the central server (e.g., server system 120). The central server can then provide the user data to the service that is ultimately requesting the user data (e.g., service provider system 145).

The data retrieved corresponds to the fields for which the domain name has been entered. The user data may include, or be associated with, contextual information indicating the context for elements of the user data (e.g., name, address, credit card number, etc.), where the appropriate user data may be retrieved based on the contextual information of the request matching or corresponding to the contextual information of the user data.

Alternatively, the user data may be stored in a storage structure (e.g., database, decentralized storage platform, etc.) separate from the blockchain. The blockchain may include an indicator for the domain name (or NFT) indicating the storage structure (e.g., database, decentralized storage platform, etc.) containing the user data, or the storage structure may be accessed directly to retrieve the user data.

The user data may be retrieved from a database by providing the domain name of the user to a database management system, which queries the database using the domain name to access the user data. User data can be stored in a relational database in which the user's domain name is associated with the user data. Optionally, the database can employ a separate encryption scheme to secure stored user data. In some embodiments, individual items of user data can be selectively stored and independently queried by further associating a data field (e.g., name, address, etc.) with the user data item. Thus, a request for user data can include a domain name of the user and a field (e.g., credit card number), enabling the database management system to retrieve a particular item of user data (e.g., the user's credit card number). The database management system may then provide the user data to the server that placed the request for user data (e.g., server system 120), which can then provide the user data to the service that is ultimately requesting the user data (e.g., service provider system 145).

In embodiments in which user data is stored across a decentralized storage platform, a server that manages the decentralized storage platform may receive a request for the user data, which can similarly specify a particular field. The server that is associated with the decentralized storage platform may then use the domain name of the user to look up a list of decentralized nodes at which pieces of user data are stored, and then obtain the requisite number of pieces user data from the decentralized nodes. The server that is associated with the decentralized storage platform combines the pieces of data and decrypts the results to obtain the requested user data. Once decrypted, the user data can be provided to the central server (e.g., server system 120). The central server can then provide the user data to the service that is ultimately requesting the user data (e.g., service provider system 145).

The user data in the storage structure may include, or be associated with, contextual information indicating the context for elements of the user data (e.g., name, address, credit card number, etc.), where the appropriate user data may be retrieved based on the contextual information of the request matching or corresponding to the contextual information of the user data in the storage structure.

User data that is encrypted can be retrieved and decrypted based on various techniques (e.g., decryption/decompression scheme, public/private key of the blockchain, public/private key separate from the blockchain, etc.) in accordance with the type of encryption scheme. For example, the user data may be encrypted using a user private key of the blockchain and decrypted using the user public key, thereby limiting control of the decryption. Further, the user data may be encrypted using public/private keys separate from the blockchain, and may be decrypted using the corresponding key or keys. Moreover, the user data may be encrypted or compressed via any conventional or other encryption/compression schemes, and may be decrypted using the corresponding decryption or decompression scheme.

If the user grants access to all of a user's data, then a trusted party (e.g., server system 120) may select, from the decrypted data, a subset of user data that corresponds to the data that is requested and for which access is authorized.

The user data is provided to the requesting entity at operation 450. Once the server (e.g., server system 120) that is responsible for processing requests obtains the data, the server may pass the requested data back to the requesting entity in order to satisfy the request. The requesting entity may use the user data to perform various operations (e.g., establish an account, perform a transaction, etc.).

Figure 5C:
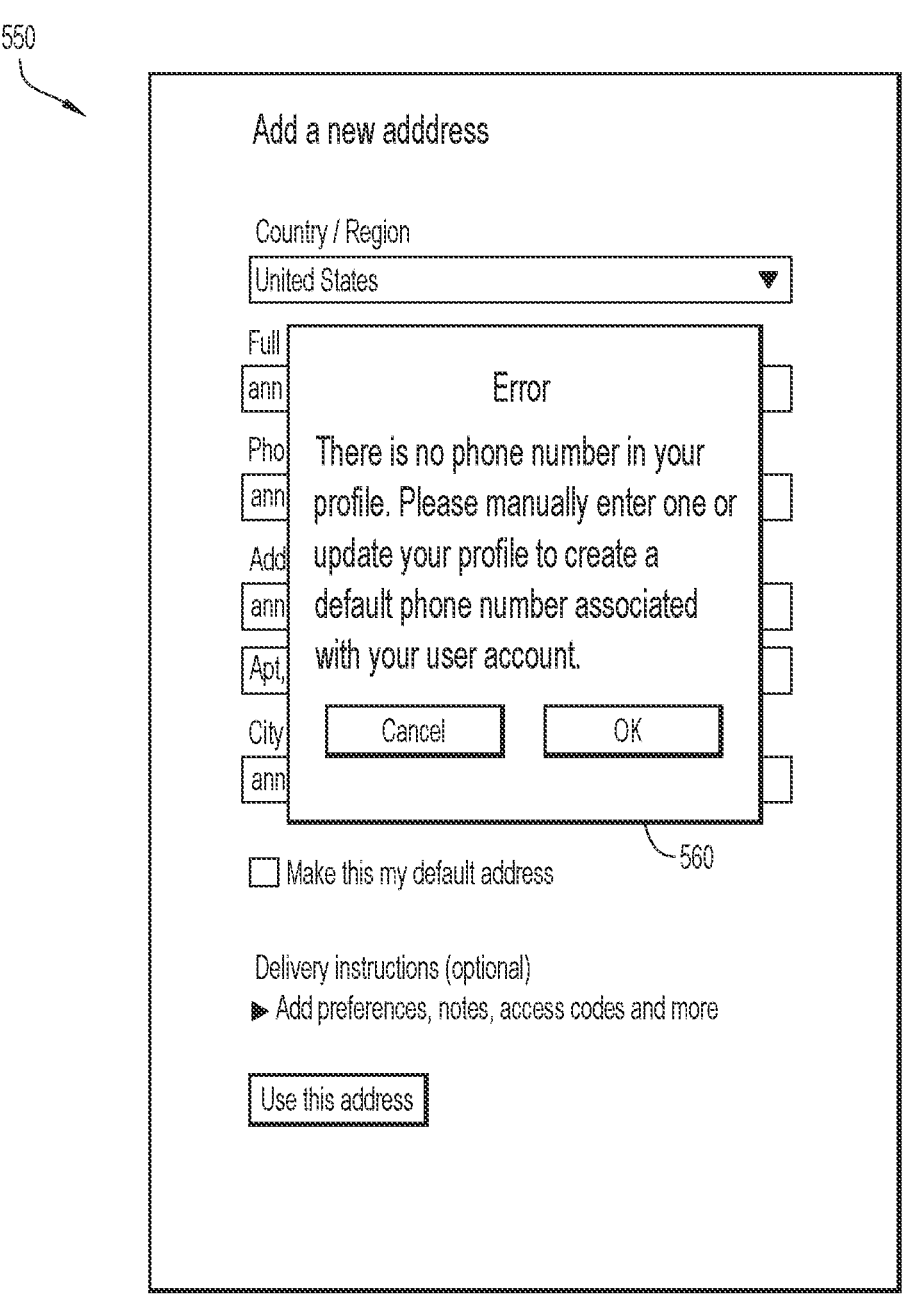

FIGS. 5A-5C are schematic illustrations of example graphical user interfaces for providing a domain name to a service according to an embodiment of the present invention. With reference first to FIG. 5A, an example graphical user interface 500 includes a form into which a user can provide input. As shown, the form is requesting various user information, and includes several data fields: a name field 510, a phone number field 520, a street address field 530, and a city field 540. However, rather than inputting the requested data, a user's domain name (e.g., "anna.wallet") has been provided into these fields as input, in accordance with present invention embodiments. Accordingly, when the service processes the user data, the service can submit a request that includes the domain name ("anna.wallet") and names of the requested data fields (name, phone number, street address, city) corresponding to the domain name. If authorized, the service can be provided with the underlying user data in substantially the same manner described above.

FIG. 5B depicts an alternative embodiment in which a graphical user interface 545 is provided that is similar to graphical user interface 500 of FIG. 5A. In the embodiment depicted by FIG. 5B, a user may only be required to insert the user's domain name into a single field, after which the domain name (or relevant underlying data) can be automatically populated into the other fields. In this depicted example, a user has provided the user's domain name to name field 510; the remaining fields may then auto-populate upon submission of the form.

Turning now to FIG. 5C, an example graphical user interface 550 is shown. Graphical user interface 550 may correspond to graphical user interface 500 of FIG. 5A or graphical user interface 545 of FIG. 5B at a time after the user has submitted the form data. In the example depicted in FIG. 5C, an error message 560 is shown. In some embodiments, when a user inputs the user's domain name instead of user data, the service or the user's endpoint device may submit a request to access the underlying user data in substantially the same manner described above. When a certain value (e.g., NULL, special code, etc.) is provided for a requested element of the user data, this indicates that the requested element is absent from the user data.

If any data is missing, an error message can be displayed to the user, prompting the user to update their profile. In particular, when a response indicates an empty field (e.g., when a NULL value or special code is returned), server system 120 may prompt the user to provide input for that particular field.

In some embodiments, when a user fills out a digital form, a plug-in on the user's endpoint device may show the retrieved values for the corresponding underlying data to the user for verification. Thus, a user can determine if there is out-of-date information in the user data. In some embodiments, when a user fills out a field, the user's endpoint device may prompt the user to select a specific data item in the case that multiple values can be retrieved. For example, if a user has several email addresses stored in the user data, the user can select a specific email address that will be retrieved when the service requests user data.

FIG. 6 is a schematic illustration of an example graphical user interface 600 for managing user data according to an embodiment of the present invention. As depicted, graphical user interface 600 includes a domain name 610, a management pane 620, a profile pane 630, and several data fields, including a phone number field 640. Domain name 610 indicates the user's domain name that can be inserted into data fields in accordance with present invention embodiments. Management pane 620 enables a user to navigate to various sections of a user's account, such as the profile pane 630, which enables a user to input information about the user. In the depicted example, phone number field 640 is blank, so inserting the domain "anna.wallet" into a service's phone number field may cause the user to be prompted to update his or her profile with a phone number. The data entered into the data fields of profile pane 630 may be shared with a server (e.g., server system 120) to cause the securely-stored user data to be updated. User data that is stored to an off-chain database or decentralized storage platform can be updated by submitting a request to a system that manages the off-chain database or decentralized storage platform to cause the data entry to be updated. In embodiments using a blockchain, the user data may be stored to the blockchain via smart contracts.

It will be appreciated that the embodiments described above and illustrated in the drawings represent only a few of the many ways of implementing embodiments for securing user data. In addition, characteristics or features of embodiments of the present invention may be combined in any fashion to provide additional embodiments of the present invention.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, hand-held devices, smartphones or other mobile devices, etc.), and may include any commercially available operating system and any combination of commercially available and custom software (e.g., communications software; server software; software of present invention embodiments (including client module 115, data management module 130, request processing module 135, service module 155, etc.), etc.). These systems may include any types of monitors and input devices (e.g., keyboard, mouse, voice recognition, etc.) to enter and/or view information.

It is to be understood that the software of the present invention embodiments (e.g., client module 115, data management module 130, request processing module 135, service module 155, etc.) may be implemented in any desired computer language and could be developed by one of ordinary skill in the computer arts based on the functional descriptions contained in the specification and flowcharts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flowcharts may be modified in any manner that accomplishes the functions described herein. In addition, the functions in the flowcharts or description may be performed in any order that accomplishes a desired operation.

The software of the present invention embodiments (e.g., client module 115, data management module 130, request processing module 135, service module 155, etc.) may be available on a non-transitory computer useable or readable medium (e.g., magnetic or optical mediums, magneto-optic mediums, CD-ROM, DVD, memory devices, etc.) of a stationary or portable computer program product, apparatus, or device for use with stand-alone systems or systems connected by a network or other communications medium.

The communication network may be implemented by any number of any type of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information (e.g., user data, domain names, private key data, personal key data, associations between particular data items, access permission data, etc.). The database system may be implemented by any number of any conventional or other databases, data stores or storage structures to store information. The database system may be included within or coupled to the server and/or client systems. The database systems and/or storage structures may be remote from or local to the computer or other processing systems, and may store any desired data.

The present invention embodiments may employ any number of any type of user interface (e.g., Graphical User Interface (GUI), command-line, prompt, etc.) for obtaining or providing information (e.g., user data, domain names, personal key data, associations between particular data items, access permission data, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for sharing any type, format, and/or volume of data using placeholder entries.

The various names and data items (e.g., domain names, user data items, etc.) may have any form or format, and may include any quantity of terms, words, tokens, or arrangements of any quantity of elements (e.g., alphanumeric or other characters, symbols, numbers, etc.). The domain names may include any domain name format, including subdomains, or may be formatted according to another schema, such as a single word, a phrase, an alphanumeric value, a value that includes extended characters, and the like.

The domain name may be registered on any quantity of any types of domain name registries for any types of systems (e.g., centralized, de-centralized, hybrid, etc.). The registration may be stored on the domain name registry in any fashion (e.g., one or more records of a registry, a non-fungible or other token of a wallet (based on the registration being on a blockchain), etc.).

The user data that is retrieved using a domain name can include any data, including text, graphical data, audio data, video data, and the like. The user data can be encrypted/decrypted according to any conventional or other encryption/decryption algorithm, and may be compressed/decompressed prior to encryption/decryption. The access permissions for user data can include any criteria, including requesting entity identity criteria, time-based criteria, location-based criteria, use case criteria, data type criteria, or other criteria.

A blockchain network that is used to store user data can include any distributed ledger, including a Bitcoin blockchain, an Ethereum blockchain, a Cardano blockchain, or other blockchain network, including private, public, and hybrid networks. The blockchain network may utilize any protocol or combination of protocols, and consensus for stored data may be achieved using any conventional or other consensus mechanism. Data stored to the blockchain may be mirrored in one or more conventional databases at the time of storage or periodically to provide a cached data store that can be accessed more quickly.

Having described preferred embodiments of a new and improved system, method, and computer program product for data resolution using domain names, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A method of securing user data comprising:
receiving, via at least one processor, a non-fungible token domain name provided by a user in one or more data fields on a user interface in place of user personal data requested by the one or more data fields of the user interface to perform an operation, wherein the user personal data requested by the one or more data fields is different than the non-fungible token domain name of the user provided in the one or more data fields of the user interface;
retrieving, via the at least one processor, the user personal data requested by the one or more data fields of the user interface from a blockchain based on the non-fungible token domain name and a particular data field in which the non-fungible token domain name is provided; and
providing, via the at least one processor, the user personal data to perform the operation.

2. The method of claim 1, further comprising:
determining that a requesting entity is authorized to receive the user personal data by obtaining permission, from the user, for the requesting entity to be provided the user personal data.

3. The method of claim 1, further comprising:
determining that a receiving entity is authorized to receive the user personal data based on a provided use case for the user personal data.

4. The method of claim 1, wherein each of the one or more data fields is selected from a group of: a name field, an email address field, a mailing address field, a credit card field, a phone number field, a billing address field, a government identifier field, a national identifier field, and a cryptocurrency wallet address field.

5. A system for securing user data comprising:
one or more memories; and
at least one processor coupled to the one or more memories, the at least one processor configured to:
receive a non-fungible token domain name provided by a user in one or more data fields on a user interface in place of user personal data requested by the one or more data fields of the user interface to perform an operation, wherein the user personal data requested by the one or more data fields is different than the non-fungible token domain name of the user provided in the one or more data fields of the user interface;
retrieve the user personal data requested by the one or more data fields of the user interface from a blockchain based on the non-fungible token domain name and a particular data field in which the non-fungible token domain name is provided; and provide the user personal data to perform the operation.

6. The system of claim 5, wherein the at least one processor is further configured to:
determine that a requesting entity is authorized to receive the user personal data by obtaining permission, from the user, for the requesting entity to be provided the user personal data.

7. The system of claim 5, wherein the at least one processor is further configured to:
determine that a receiving entity is authorized to receive the user personal data based on a provided use case for the user personal data.

8. The system of claim 5, wherein each of the one or more data fields is selected from a group of: a name field, an email address field, a mailing address field, a credit card field, a phone number field, a billing address field, a government identifier field, a national identifier field, and a cryptocurrency wallet address field.

9. A computer program product for securing user data, the computer program product comprising one or more non-transitory computer readable media having instructions stored thereon, the instructions executable by at least one processor to cause the at least one processor to:
receive a non-fungible token domain name provided by a user in one or more data fields on a user interface in place of user personal data requested by the one or more data fields of the user interface to perform an operation, wherein the user personal data requested by the one or more data fields is different than the non-fungible token domain name of the user provided in the one or more data fields of the user interface;
retrieve the user personal data requested by the one or more data fields of the user interface from a blockchain based on the non-fungible token domain name and a particular data field in which the non-fungible token domain name is provided; and
provide the user personal data to perform the operation.

10. The computer program product of claim 9, wherein the instructions executable by the at least one processor further cause the at least one processor to:
determine that a requesting entity is authorized to receive the user personal data by obtaining permission, from the user, for the requesting entity to be provided the user personal data.

11. The computer program product of claim 9, wherein the instructions executable by the at least one processor further cause the at least one processor to:
determine that a receiving entity is authorized to receive the user personal data based on a provided use case for the user personal data.

12. The computer program product of claim 9, wherein each of the one or more data fields is selected from a group of: a name field, an email address field, a mailing address field, a credit card field, a phone number field, a billing address field, a government identifier field, a national identifier field, and a cryptocurrency wallet address field.

* * * * *